L. A. TRIPP.

Curtain-Fixtures.

No. 5,439. Reissued June 3, 1873.

WITNESSES.

C. A. Pease

J. M. McElroy

ASSIGNEE OF THE INVENTOR,

L. A. TRIPP.

Salem Shade Roller Manufacturing Company per Brown Brothers Attorneys.

AM. PHOTO-LITHOGRAPHIC CO. N.Y. (OSBORNE'S PROCESS.)

UNITED STATES PATENT OFFICE.

THE SALEM SHADE-ROLLER MANUFACTURING COMPANY, OF SALEM, MASSACHUSETTS, ASSIGNEE, BY MESNE ASSIGNMENTS, OF L. A. TRIPP, DECEASED.

IMPROVEMENT IN CURTAIN-FIXTURES.

Specification forming part of Letters Patent No. 67,465, dated August 6, 1867; reissue No. 5,439, dated June 3, 1873; application filed April 25, 1873.

*To all whom it may concern:*

Be it known that L. A. TRIPP, (now deceased,) of Middletown, Orange county, State of New York, did invent a Window-Shade Fixture, of which the following is a specification:

This invention relates to window-shade or curtain fixture employing a spiral or other suitable spring for automatically winding the shade or curtain upon its roller, and more particularly to that class of such fixtures as are provided with a detent and a ratchet or notched periphery for restraining and holding the spring against action, and thus the curtain at any elevation desired.

The object of this invention is to prevent contact between the detent and ratchet when the roller is under a free revolution from its spring, and thus as a consequence obviate the wearing away either of the detent or of the ratchet; and for this object the invention consists in the application of the detent to the revolving roller, and of the ratchet to a stationary part.

In the accompanying plate of drawings a window-shade or curtain-fixture, constructed and arranged in accordance with this invention, is illustrated—

Figure 1:
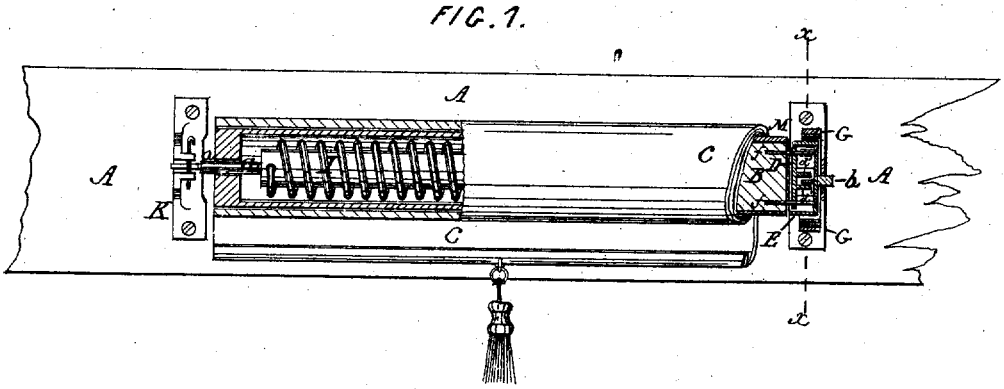
Figure 2:
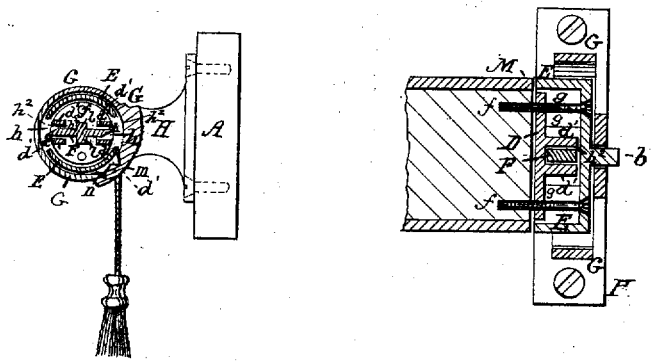

Figure 1 representing a window-shade with the roller hung in supports at each end, and in a partial section, and the detent and ratchet as disengaged; Fig. 2, a detail cross-section in plane of line *x x*, Fig. 1.

A in the drawings represents the window-casing; B, the shade-roller, to which the shade C is secured in the ordinary manner; I, a spiral spring within roller B, to which at one end it is secured, and at the other end to the journal *a*, at one end of the roller. The roller B is suspended by its journal *a* in a bracket, K, and by a journal, *b*, at its opposite end in a bracket, H; E, a cap secured by screws *f* to the end M of the roller B, and forming a chamber, *g*, at such end. This cap carries the journal *b* of the roller, and at two points of its rim, diametrically opposite to each other, there is a corresponding slot, *h*, and both slots open to the chamber *g*; D, a plate within chamber *g*, and secured against roller-end M by the same screws *f* as secure the cap E; *d′ d′*, four lugs or projections on the exposed face, and on opposite sides of the center of plate D. These lugs *d′ d′* are at or near the edge of the plate, and have a corresponding way or space, $h^2$, between them, with both ways $h^2$ of equal width and in and along a common diametrical line of the plate D or roller B, that is coincident with the diametrical line of the slots *h* of the cap E; F, a bolt, which is the detent of the fixture. This detent F is within the cap E, between the lugs *d′* of the plate D, and, as it extends from one set of lugs, *d′ d′*, to the other, it is free to move lengthwise between them. The length of the detent F equals, or nearly so, the external diameter of the cap E, and each of its ends is similarly beveled on opposite sides; *l l*, lugs on detent F, midway between its two ends. The lugs *l l* hold the detent against detachment from the cap E, but do not prevent the detent from projecting sufficiently through the cap-slots *h h* for its projecting end to interlock with a stationary surface or ring, G. This ring G projects from the roller-bracket H, and, in the present instance, is represented as solid with the said bracket. This ring G constitutes the ratchet of the fixture, and its internal periphery is concentric substantially with the axis of rotation of the roller-journal *b* in the bracket H, and its internal diameter is a little longer than the internal diameter of the roller-cap E; *m* and *n*, two notches of different depths at the lower side of the inner periphery of the ring, and with these notches the detent is to interlock when the roller is not revolving. The said notches *m* and *n* are somewhat of the shape of ratchet-teeth, (see Fig. 2.)

Under the herein-described construction and arrangement of parts, and their application to curtain-fixtures, the action of both the spring I in the rolling-up, and the detent F and ratchet G in the unrolling and the holding of the curtain from unrolling, are substantially the same as that of the like parts in similar curtain-fixtures, and therefore needs no particular description herein, but the fixture is substantially different from all other fixtures before known.

What is claimed as the invention of the said TRIPP is—

The arrangement of the roller B, detent F, and ratchet G, so that the detent shall revolve with the roller and be held from engaging with the ratchet by such revolution, all substantially as described.

SALEM SHADE-ROLLER MANUFACTURING CO.,
By JAMES F. ALMY, *Treasurer.*

Witnesses:

ALBERT W. BROWN,
EDWIN W. BROWN.